United States Patent [19]
Guinn et al.

[11] Patent Number: 4,938,010
[45] Date of Patent: Jul. 3, 1990

[54] HARVESTING HEADER HAVING ADJUSTABLE WIDTH, DRAPER BELT DISCHARGE OPENING

[75] Inventors: Ronald K. Guinn, Valley Center; Ray Schmitt, Hesston; James W. Schroeder, Newton, all of Kans.

[73] Assignee: Hay & Forage Industries, Hesston, Kans.

[21] Appl. No.: 196,293

[22] Filed: May 20, 1988

[51] Int. Cl.⁵ ..................... A01D 34/12; A01D 57/20
[52] U.S. Cl. .......................................... 56/181; 56/192
[58] Field of Search ................. 56/181, 182, 183, 208, 56/11.2, 14.5, 192, 10.4; 198/314, 370

[56] References Cited
U.S. PATENT DOCUMENTS

| | | | |
|---|---|---|---|
| 3,695,015 | 10/1972 | Twidale et al. | 56/181 |
| 4,429,517 | 3/1971 | Lohrentz et al. | 56/181 |
| 4,519,190 | 5/1985 | Blakeslee | 56/181 |

Primary Examiner—Jerome W. Massie, IV
Assistant Examiner—Matthew Smith

Attorney, Agent, or Firm—Hovey, Williams, Timmons & Collins

[57] ABSTRACT

A harvester having hydraulically shiftable draper sections for left, right or center crop discharge has a pair of movement limiting tangs which are carried by the draper sections at either of one of two selected locations in order to enable the lateral dimension or width of the discharge opening to be varied in accordance with crop conditions. When the standing crop is relatively dense, the tangs are positioned in an inboard location on the draper carriages so that the width of the discharge opening is maximized. Alternately, the tangs can be positioned in outward locations on the carriages for limiting lateral movement of the latter and reducing the width of the discharge opening so that the crop materials under relatively light crop conditions are formed into a dense, interlaced windrow having a central snow and ice shedding ridge. Enlarge deflectors fixed to opposite side portions of the header substantially cover the gap when the draper sections are shifted inwardly so that the majority of the severed crop materials are directed onto the draper sections and toward the discharge opening.

5 Claims, 4 Drawing Sheets

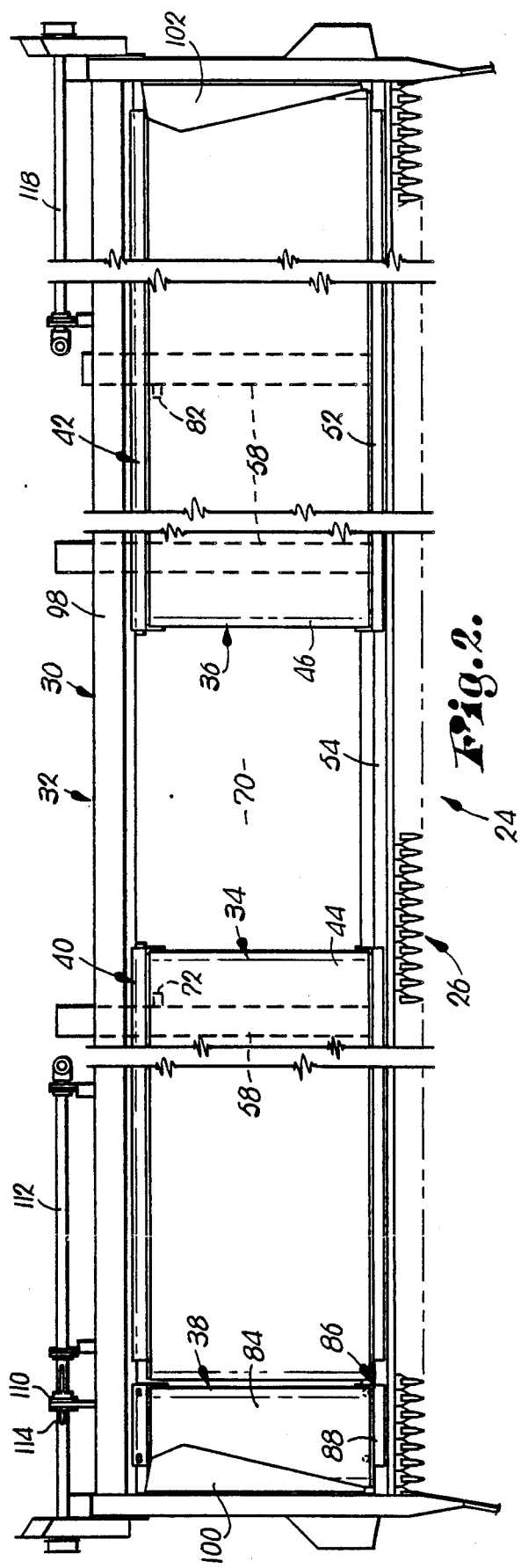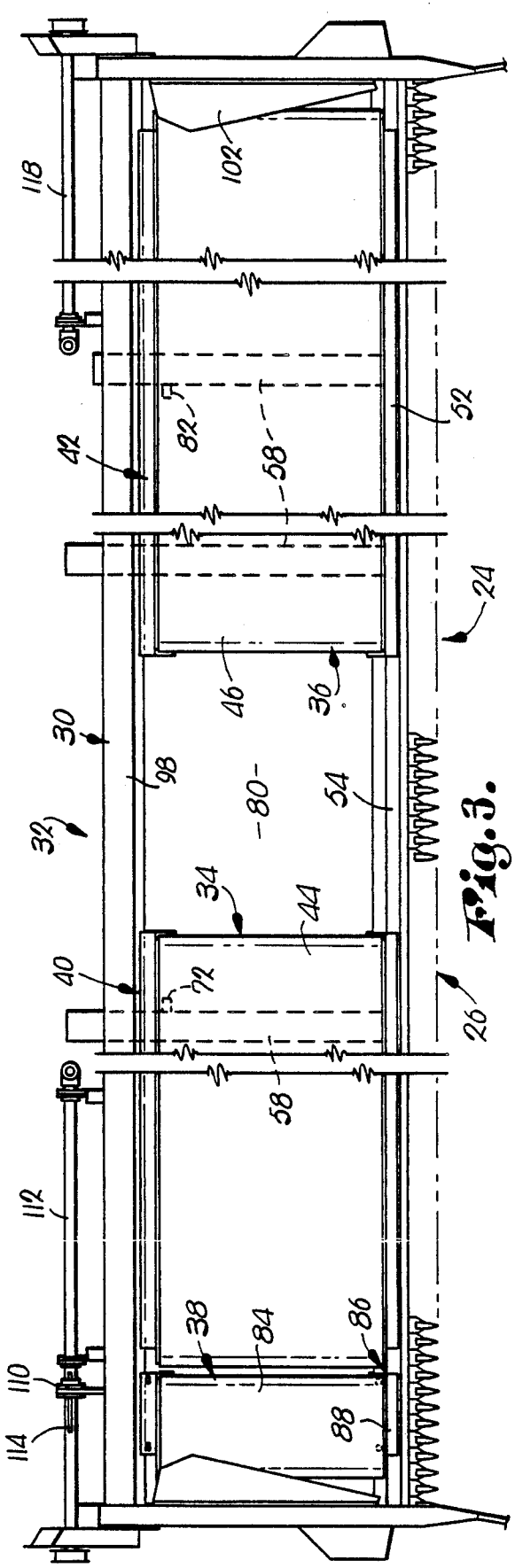

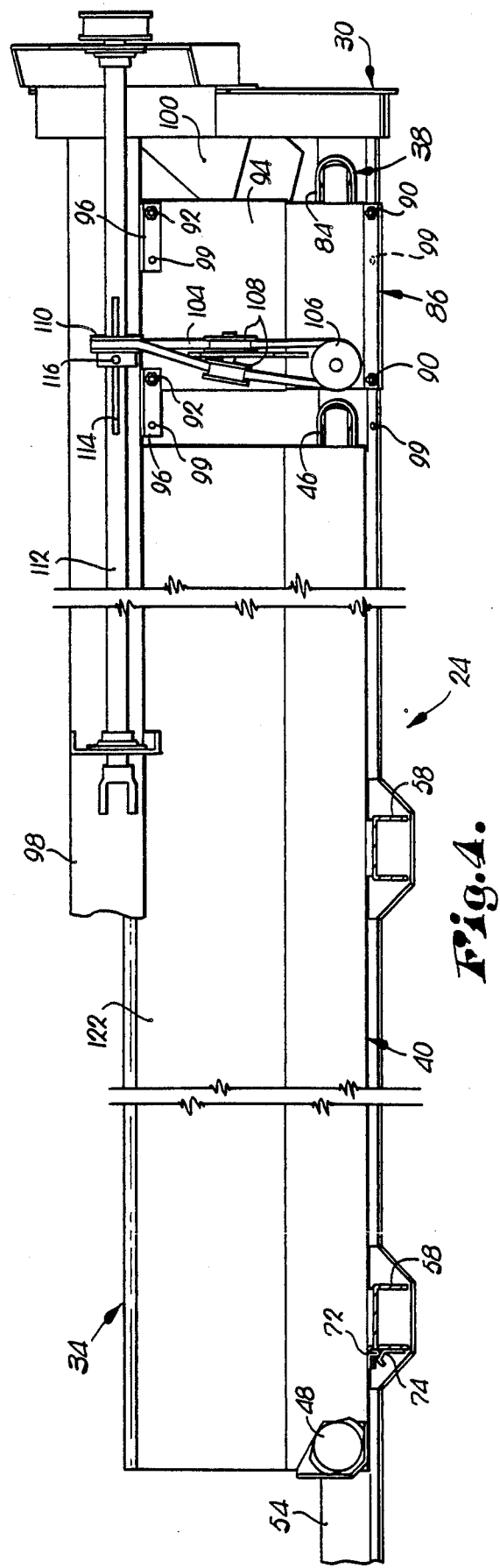
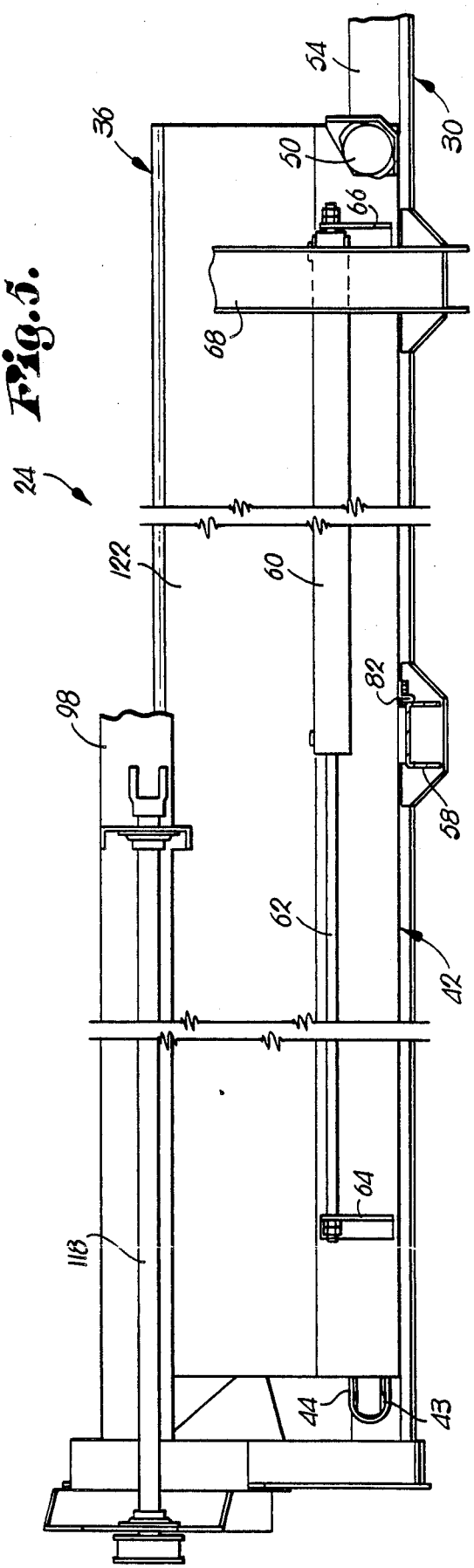

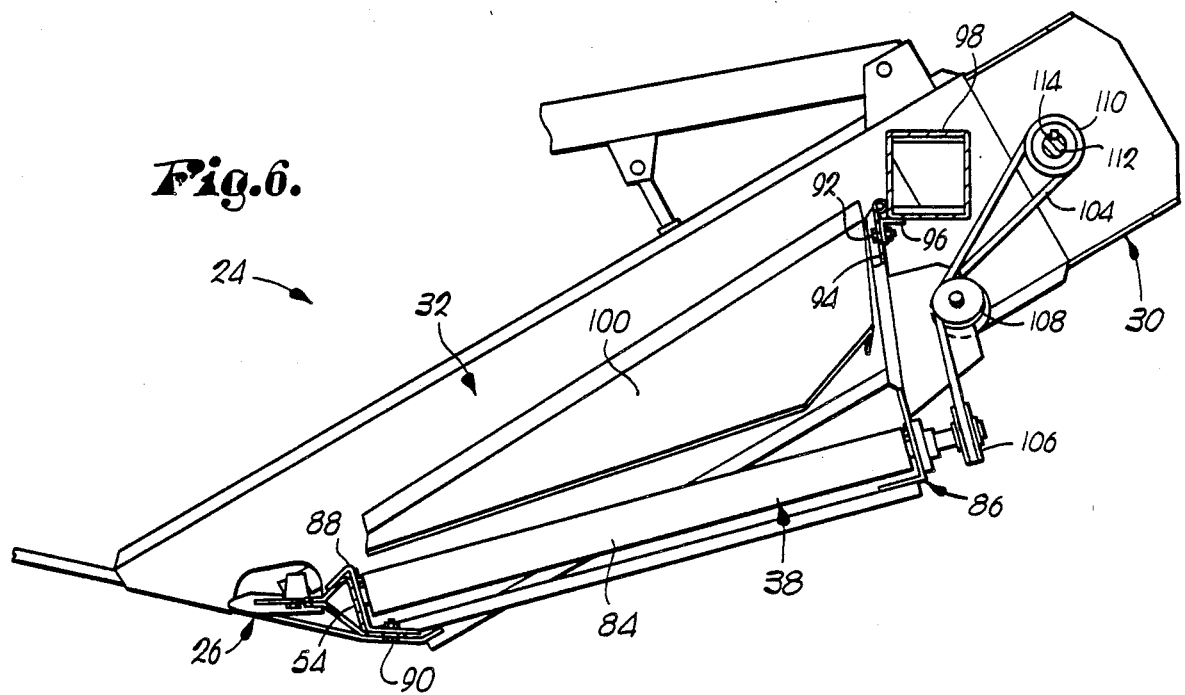
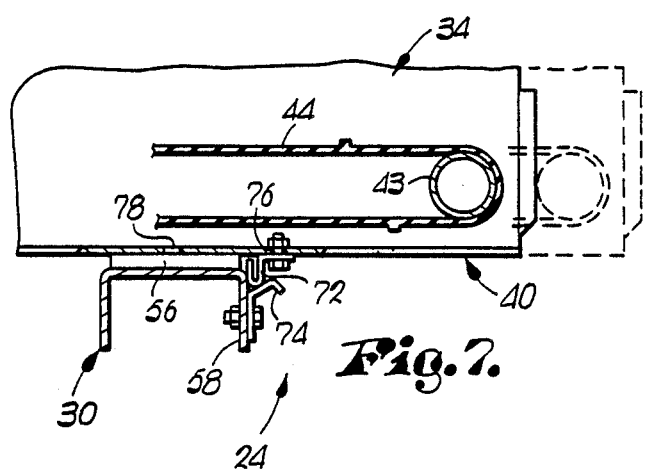
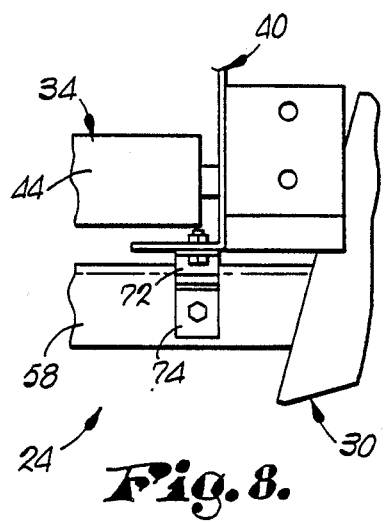

HARVESTING HEADER HAVING ADJUSTABLE WIDTH, DRAPER BELT DISCHARGE OPENING

BACKGROUND OF THE INVENTION

1. Field of the Invention

This invention relates to crop harvesting headers having draper or conveyor sections movable in lateral directions for either left, right, or center crop delivery through a discharge opening and onto the ground in a windrow.

2. Description of the Prior Art

Windrowing headers equipped with conveyors in the form of drapers are widely used in certain regions of the world. Typically, draper windrowers are provided with at least two independent draper sections which cooperate to transversely convey the severed crop materials toward an opening for discharging the materials on the ground to form a windrow during advancement of the machine.

In some instances, the draper sections of windrowing headers are shiftable in directions laterally of the path of travel of the machine to cooperating positions such that the discharge opening is located either adjacent the right or left side of the machine or alternately is positioned near the center of the header. Hydraulic cylinders are utilized to transversely shift the draper sections during the harvesting operation so that the discharged crop materials are laid down in a windrow beside a previously formed windrow in order that the harvesting machine subsequently processing the crop materials will have a larger volume of material to pick up along each pass across the field.

A number of factors are known to affect crop yield and consequently the volume of severed crop materials per linear foot of windrow may vary from year to year. In instances where crop yield is relatively heavy, the discharge opening normally provided by conventional draper harvesters is of a width for satisfactorily establishing a well-formed windrow wherein the crop materials are substantially interlaced for resisting dispersement by wind, and wherein the windrow presents an elongated, central apex extending the length of the windrow for preventing collection of snow which might otherwise impair the quality of the crop materials.

There are times, however, when the standing crop density is relatively light such as after growing periods when rainfall has been inadequate. The less dense windrow formed by the above-mentioned opening of the harvester under such conditions is not well formed by comparison and may present an elongated depression along the center of the windrow which is susceptible to collection of snow and ice. Moreover, the crop materials under these circumstances may be insufficently interlaced and as a result may be unable to adequately resist scattering due to the influence of driving winds.

In the past, certain manufacturers have attempted to alleviate the above-noted problems by providing an extra length of conveyor fabric (such as canvas or synthetic rubber) which may be added to the existing draper sections to reduce the transverse width of the discharge opening. To extend the conveyor sections, the user attempting such a conversion would first disassemble the draper and add the additional fabric section, and then extend the carriage frame by adding additional members in order to stretch the draper to the proper transverse width. However, such a process must be normally repeated for each draper section and often entails a laborsome task extending over a number of hours.

Obviously, it would be highly desirable to reduce the time necessary for varying the discharge opening width of conventional harvesters. In many cases, the header may be put to use each season in a number of different fields, and a simplified apparatus for adjusting the discharge width would certainly be desirable since crop conditions may vary from field to field.

SUMMARY OF THE INVENTION

In accordance with the invention, a harvester header has a pair of draper sections which, in addition to being shiftable laterally between cooperating positions for left, right, and center delivery of the severed materials, are also shiftable through a limited distance of travel away from adjacent sides of the machine for narrowing the discharge opening when desired. A pair of enlarged deflecting shields connected to opposite sides of the header substantially cover the gap between outboard ends of the draper sections and respective side portions of the machine when the discharge opening is narrowed in order to deflect the substantial majority of the crop materials severed in regions adjacent the gap onto the draper sections for delivery to the discharge opening.

In more detail, each of the shiftable draper sections is provided with a stop in the nature of a tang which limits lateral movement of the respective section toward the associated, adjacent side of the machine. Each tang is removably coupled by bolt to the underside of a carriage supporting one of the draper sections, and the carriage has an additional set of apertures for receiving the tang mounting bolts when it is desired to change the width of the discharge opening. Powered shifting of the draper sections is thereafter limited by the tangs which together determine the width of the discharge opening.

Preferably, a single hydraulic cylinder and piston assembly is utilized to shift both of the draper sections. When either left or right discharge is desired, the draper sections are bolted together for simultaneous movement by the piston and cylinder assembly. On the other hand, when a central discharge is desired, the draper sections are disconnected from each other and a keeper releasably engages the tang of one section for retaining the latter in position while the hydraulic cylinder and piston assembly is utilized to maintain the lateral orientation of the other draper section in spaced apart relation to the first section.

Optionally, a third, somewhat smaller draper section may be provided on one side of the header in order to establish working room for double windrow harvesting operations. The smaller draper section is releasably connected by bolts to a frame portion of the machine, and additional apertures are provided for varying the lateral orientation of the smaller draper section and adjustment of the discharge opening when needed. The position of the limiting tangs mounted on the adjacent, hydraulically shiftable draper section is coordinated with the possible positions of the smaller draper section to eliminate the formation of any substantial gap between the two sections and ensure that the conveyed materials reach the desired discharge opening of the header.

BRIEF DESCRIPTION OF THE DRAWINGS

FIG. 2 is a reduced, fragmentary, plan view of the header shown in FIG. 1, illustrating among other things a pair of shiftable draper sections along with a somewhat smaller, side mounted draper section which together cooperate to convey severed crop materials toward a central discharge opening;

FIG. 3 is a view somewhat similar to FIG. 2 except that the three draper sections have been shifted inwardly in a lateral direction to reduce the width of the central discharge opening;

FIG. 4 is a reduced, fragmentary, rear elevational view of two of the draper sections shown in FIG. 2;

FIG. 5 is a reduced, fragmentary, rear elevational view of the remaining draper section shown in FIG. 2;

FIG. 6 is a fragmentary, side cross-sectional view of the header shown in FIG. 1 looking in an opposite direction and depicting, among other things, the belt drive for the smaller draper section and one of two deflectors which are mounted on opposite sides machine;

FIG. 7 is a fragmentary, enlarged, front cross-sectional view of the draper section illustrated in FIG. 4, depicting a tang and keeper for limiting lateral movement of the section and releasably maintaining latter in place; and FIG. 8 is an enlarged, fragmentary, side elevational view of the draper section, tang and keeper shown in FIG. 7.

DETAILED DESCRIPTION OF THE DRAWINGS

Figure 1:
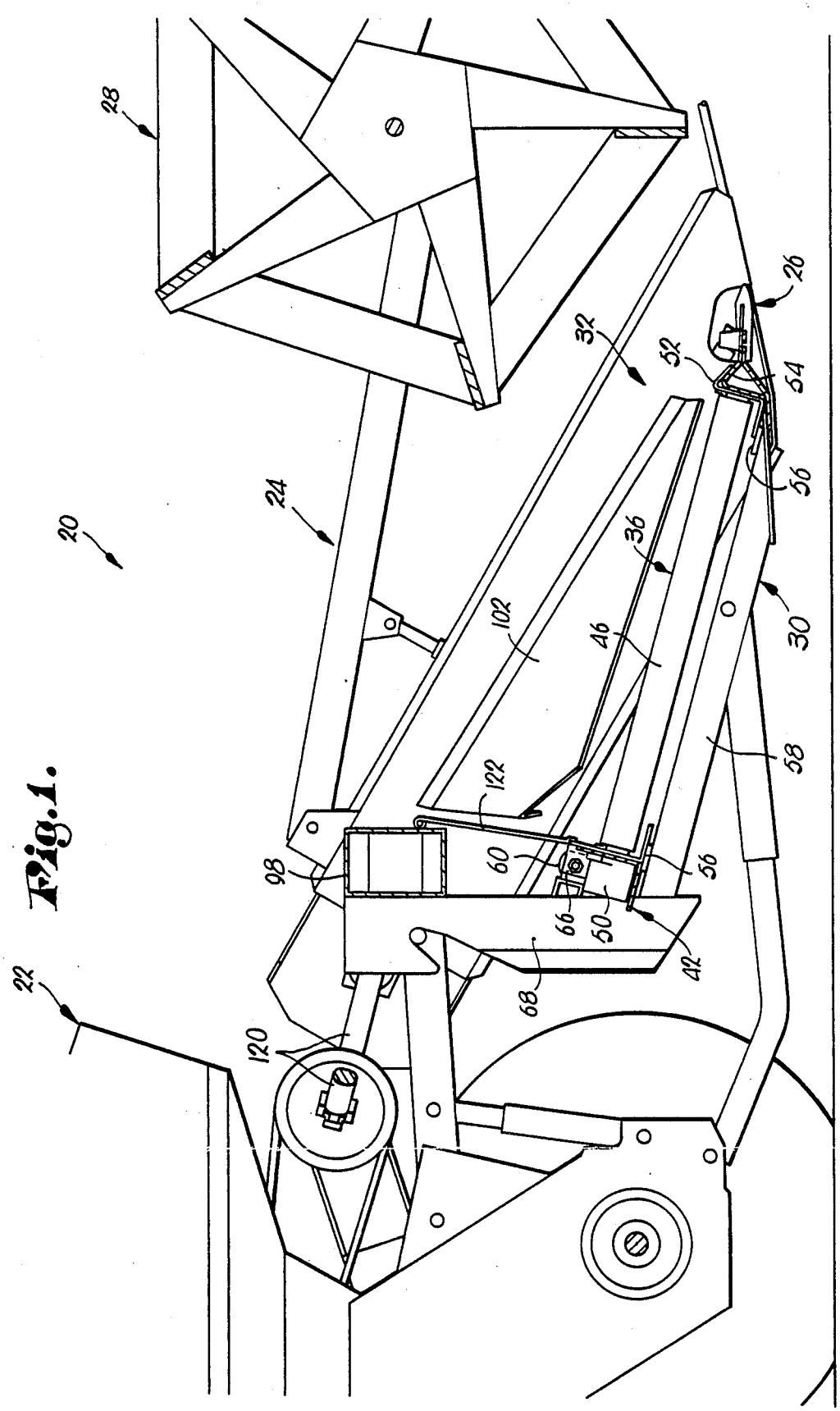
FIG. 1 is a fragmentary, side cross-sectional view of a harvester having a header embodying the principles of the present invention.

Referring initially to FIG. 1, the harvester 20 broadly includes a propelling vehicle such as a tractor 22 and a header 24 coupled to the tractor 22 for movement across a field and along a path of travel. A reciprocating sickle assembly 26 extends along the front of the header 24 for severing standing crops as the harvester 20 is advanced, and a reel 28 is supported by a frame 30 of the header 24 for the purpose of sweeping standing crops toward the sickle assembly 26 and directing the severed crop materials in a rearwardly direction as the header 24 is advanced.

The header 24 has a conveyor 32 which comprises three independent conveyor sections, namely right conveyor section 34 and left conveyor section 36 as well as a smaller conveyor section 38 as can be best understood by reference to FIGS. 2 and 3. The larger conveyor sections 34, 36 are also shown in FIGS. 4 and 5 and each include a separate subframe or carriage 40, 42 respectively which rotatably carries a number of conveyor rollers such as rollers 43. Each of the sections 34, 36 has a draper 44, 46 respectively which is trained about its associated rollers 43 for loop-wise movement in directions laterally of the path of travel of the harvester 20.

The draper 44 of the right conveyor section 34 is driven by a hydraulic motor 48 which is illustrated in FIG. 4. On the other hand, the draper 46 for the left conveyor section 36 is driven by a hydraulic motor 50 which is shown in FIG. 5.

Both of the carriages 40, 42 are mounted for shifting movement in directions laterally of the direction of advancement of harvester 20. One side of each carriage 40, 42 has an elongated structure 52 (such as is shown in FIG. 1) that has a "Z" shape in transverse configuration and which slidingly engages matingly inclined surfaces of a support 54 associated with the sickle assembly 26. Each carriage 40, 42 slides during lateral shifting movement over nylon blocks 56 which are fixed to inclined channels 58 forming a part of the harvester frame 30.

Turning now to FIG. 5, a means for selectively shifting the left conveyor section 36 comprises a hydraulically operated piston and cylinder assembly which includes a cylinder 60 and a doubleended piston member 62. One end of the piston member 62 is connected to a bracket 64 fixed to one end portion of the left conveyor carriage 42, while the opposite end of the piston member 62 is coupled to a bracket 66 that is, in turn, fixed to the remaining end portion of the left conveyor carriage 42. The cylinder 60 is supported by a member 68 that comprises a part of the header frame 30.

When it is desired, for example, to shift the right conveyor section 34 in lateral directions simultaneously with similar movement of the left conveyor 36, a number of bolts (not shown) may be utilized to couple the end of the left conveyor carriage 42 near hydraulic motor 50 to the adjacent end of the right conveyor carriage 40 near motor 48. In this manner, both of the sections 34, 36 are shifted together by the piston member 62 for discharge of crop materials conveyed by the drapers 44, 46 to one side or another of the header 24. Alternately, if center discharge of crop materials is desired, then the bolts are removed to uncouple the sections 34, 36, and the latter are instead spaced apart in the manner shown in FIG. 2 for presentation of an essentially central, rectangular discharge opening 70.

A means for limiting the extent of laterally outbound movement of the right conveyor section 34 comprises a U-shaped tang 72 that is bolted to the underside of the right carriage 40 as can be seen by reference to FIGS. 7 and 8. As the right conveyor section 34 is shifted toward the smaller conveyor section 38, the tang 72 rides up and over an inverted V-shaped keeper 74 that is fixedly connected to one of the frame channels 58. The right carriage 40 hops up as the tang 72 rides over the keeper 74, and the right carriage 40 comes to a halt once the tang 72 engages a corner portion of the adjacent frame channel 58.

A means for selectively varying the lateral dimension or width of the discharge opening of header 24 (and for limiting the extent of outbound movement of the right conveyor section 34) comprises a pair of bolt holes 76, 78 that are formed in the underside of the right carriage 40 for enabling the orientation of the tang 72 to be changed relative to the carriage 40 in a lateral, or elongated direction. When, for instance, the bolt supporting the tang 72 is inserted through bolt hole 76, the extent of laterally outward movement of the right conveyor section 34 is limited to the orientation shown in FIG. 2. If, instead, the bolt supporting the tang 72 is inserted through bolt hole 78, outward movement of the right conveyor section 34 is limited to the position shown in FIG. 3 such that a central discharge opening 80 of the header 24 is somewhat smaller in width than the discharge opening 70 illustrated in FIG. 2.

Although not shown in detail, the left conveyor section 36 has a tang 82 somewhat similar in configuration and function to the tang 72 for limiting outbound movement of the left carriage 42. The position of the tang 82 on the left conveyor section 36 is shown in FIGS. 2 and 3, and the tang 82 comes into contact with one of the frame channels 58 during shifting of the section 36 to thereby limit further outbound movement of left carriage 42.

The left carriage 42 is formed with two bolts holes similar to holes 76, 78 so that the position of the tang 82 can be varied in a lateral direction relative to carriage 42. Thus, adjustment of the position of tang 82 on the carriage 42 also enables the width of the discharge opening of the header 24 to be varied as desired. The changeover can be effected in a relatively short period of time, inasmuch as only a single bolt is utilized to couple the tangs 72, 82 to the respective sections 34, 36.

The tang 82 associated with the left conveyor section 34 does not cooperate with a keeper similar to keeper 74. Instead, the hydraulic cylinder 60 and piston member 62 are utilized to hold the left conveyor section 36 in place, with the tang 82 in abutting contact with the frame channel 58 so that the left conveyor section 36 does not jostle about or shift accidentally during operation of the header 20. As should now be understood, the keeper 74 functions to prevent such unintentional movement with regard to the right conveyor section 34.

The smaller conveyor section 38 is shown in FIGS. 2-4, and 6 and is positioned between the right conveyor section 34 and the adjacent side portion of the header frame 30. The conveyor section 38 includes a rubberized or fabric draper 84 that travels in an endless loop about rollers that are rotatably supported by a carriage 86. The carriage 86 includes a lower, somewhat Z-shaped structure 88 that rides along the top of the sickle assembly support 54 for guiding the movement of the conveyor section 40 when the latter is shifted in lateral directions.

The small conveyor section 38 can be laterally positioned in either of two orientations as can be appreciated by comparison of FIGS. 2 and 3. The conveyor carriage 86 is coupled to the header frame 30 by two bolts which extend through the carriage structure 88 and the sickle assembly support 54 in the manner shown in FIG. 6. Another pair of bolts 92 extends through an upright shield 94 that is fixed to the carriage 86, and the bolts 92 are connected to a bracket 96 fixed to a beam 98 that comprises part of the header frame 30.

The bracket 96 as well as the sickle assembly support 54 are formed with a pair of laterally spaced apart holes 99 for reception of each bolt as shown in FIG. 4. Thus, the smaller conveyor section 38 can be bolted to the header frame 30 in the orientation shown in FIG. 2, or alternately in the orientation illustrated in FIG. 3 by selection of the proper bolt holes 99 and alignment of the carriage 86 with the selected set of holes 99.

Each side of the header 24 is provided with a shield or deflector 100, 102 for directing crops severed by the outmost end portions of the sickle assembly 26 onto adjacent regions of the conveyor sections 38, 36 respectively. The inclined orientation and the somewhat trapezoidal configuration of the deflectors 100, 102 can be understood by reference to FIGS. 1-3, and the deflectors 100, 102 are larger in width than prior art deflectors to ensure that a substantial portion of the crop severed by endmost regions of the sickle assembly 26 are properly directed to the conveyor sections 38, 36 without falling through the gap which is present between the latter conveyor sections and adjacent side regions of the header frame 30 when the conveyor sections 34, 36, 38 are shifted inwardly to present the smaller discharge opening 80 that is depicted in FIG. 3.

The draper 84 of the smaller conveyor section 38 is driven for closed loop movement by means of a belt 104 that is illustrated in FIGS. 4 and 6. The belt 104 extends around a pulley 106 that is secured to a shaft of one of the rollers supporting the draper 84, and the belt 104 is also trained about two idler pulleys 108 and another pulley 110 that is connected to a drive shaft 112. The pulley 110 is shiftable along the length of shaft 112 when it is desired to move the smaller conveyor section 38 either laterally inward or outward, and an elongated key 114 interconnects the drive shaft 112 and pulley 110 while a set screw 116 is provided to releasably retain the pulley 110 in the selected position on drive shaft 112.

The drive shaft 112, along with a similar drive shaft 118 that is shown in FIGS. 2, 3, and 5, together provide power to the sickle assembly 26. Inboard ends of the drive shafts 112, 118 have U joint couplings which are connected to respective shafts such as shaft 120 (see FIG. 1) that, in turn, are together coupled to a drive shaft powered by tractor 22.

Finally, the conveyor sections 34, 36 are each provided with an upright shield 122 which functions in a manner similar to the shield 94 of the smaller conveyor section 38 to deflect crops severed by the adjacent regions of the sickle assembly 26 onto the uppermost reaches of the draper below. The shields 122 are each fixed to one of the carriages 40, 42 for lateral movement therewith as the conveyor sections 34, 36 are shifted toward or away from the center of the header 24, and each shield 122 has an upper rolled edge which can be seen in FIG. 1 for sliding engagement with the side of beam 98.

OPERATION

In use, the drapers 44, 46, 84 travel in cooperating, rotative directions to convey severed crop materials toward the discharge opening. When, for example, the sections 34, 36, 38 are positioned for central discharge in either the orientation shown in FIG. 2 or the orientation shown in FIG. 3, the uppermost reaches of the drapers 44, 46, 84 travel in a respective direction to urge the crop materials toward the discharge opening 70 or 80. On the other hand, if the right conveyor section 34 is bolted to the left conveyor section 34 for simultaneous movement during operation of the cylinder 60 and piston member 62, drapers 44, 46 travel in the same rotative direction for side discharge of the crops.

The hydraulic motors 48, 50 are interconnected with the controls for the hydraulic circuit providing fluid to the cylinder 60 so that the rotative direction of travel of the drapers 44, 46 is switched to an opposite direction as the sections 34, 36 are shifted from one side of the header 24 to the other for side crop discharge. For the latter operation, the hydraulic hoses connected to the hydraulic motor 48 are reversed so that the drapers 44, 46 travel in the same direction instead of the opposite direction necessary for proper operation during central crop discharge. The draper 84 of the smaller conveyor section 28 always rotates in the same direction, since the draper 84 instead powered for movement by means of the drive shaft 112.

The width of the discharge opening may be varied in accordance with crop conditions whether or not the header 24 is set up to provide central crop discharge or alternating right and left crop discharge. In brief, the operator need merely change the position of the smaller conveyor section 38 by inserting bolts 90, 92 in different holes, and then reposition the tangs 72, 82 in alignment with the proper, corresponding holes of the carriages 40, 42. The tangs 72, 82 thereafter limit outboard movement of conveyor sections 34, 36 so that the discharge opening (whether right, left or central) is of a proper width to form a well interlaced windrow having an elongated, central ridge or peak.

We claim:

1. In a harvesting header having a frame movable over the ground along a path of travel, the frame including opposite side portions, the header including a pair of transverse crop conveyor sections and shifting means for selectively shifting the conveyor sections toward or away from either side portion of the frame between cooperating positions for alternative left, right or center delivery of severed crops through a discharge opening of a predetermined width in directions laterally of the path of travel, the improvement comprising:

limit means for limiting movement of each of the crop conveyor sections past a predetermined position when that section is shifted toward the closest side portion of the frame, the predetermined width of the discharge opening being defined by the position of the crop conveyor sections when at least one of the conveyor sections is located at the first predetermined position; and limit stop adjustment means for adjusting the predetermined position at which each of the crop conveyor sections is limited from further movement toward the closest side portion of the frame so that the predetermined width of the discharge opening is made variable.

2. The invention as set forth in claim 1, wherein said limit means includes an outwardly projecting tang member connected to one of said frame and said conveyor sections.

3. The invention as set forth in claim 2, wherein said tang member is releasably connected to one of said conveyor sections and is movable between any one of a number of positions on the latter for providing adjustment of the width of said discharge opening.

4. The invention as set forth in claim 1, and including a third transverse crop conveyor section positioned between one of said pair of transverse crop conveyor sections and an adjacent side portion of said frame.

5. The invention as set forth in claim 4, further comprising adjustment means for adjusting the position of the third transverse crop conveyor section relative to the frame in order to permit the third transverse crop conveyor section to be moved to a position adjacent the predetermined position of the nearest other crop engaging section when the predetermined position of that section is adjusted by the limit stop adjustment means.

* * * * *